United States Patent
Zhang et al.

(10) Patent No.: US 12,257,551 B2
(45) Date of Patent: Mar. 25, 2025

(54) MULTI-STAGE BIPOLAR ELECTRODIALYSIS SYSTEM FOR HIGH CONCENTRATION ACID OR BASE PRODUCTION

(71) Applicant: BL TECHNOLOGIES, INC., Minnetonka, MN (US)

(72) Inventors: Chengqian Zhang, Pudong (CN); Wei Lu, Pudong (CN); Jiyang Xia, Pudong (CN); Yongchang Zheng, Westborough, MA (US); Bruce Batchelder, Burlington, MA (US); John H. Barber, Guelph (CA)

(73) Assignee: BL TECHNOLOGIES, INC., Minnetonka, MN (US)

( * ) Notice: Subject to any disclaimer, the term of this patent is extended or adjusted under 35 U.S.C. 154(b) by 1070 days.

(21) Appl. No.: 16/978,985

(22) PCT Filed: Mar. 12, 2019

(86) PCT No.: PCT/US2019/021784
§ 371 (c)(1),
(2) Date: Sep. 8, 2020

(87) PCT Pub. No.: WO2019/178049
PCT Pub. Date: Sep. 19, 2019

(65) Prior Publication Data
US 2021/0069645 A1    Mar. 11, 2021

(30) Foreign Application Priority Data
Mar. 13, 2018 (CN) ..................... 201810204417.8

(51) Int. Cl.
*B01D 61/44* (2006.01)
*B01D 61/46* (2006.01)
(Continued)

(52) U.S. Cl.
CPC ......... *B01D 61/445* (2013.01); *B01D 61/465* (2022.08); *B01D 69/02* (2013.01);
(Continued)

(58) Field of Classification Search
CPC .... B01D 31/42; B01D 31/422; B01D 31/423; B01D 31/44; B01D 31/46; B01D 2319/06; B01D 2315/24; C02F 1/4693
See application file for complete search history.

(56) References Cited

U.S. PATENT DOCUMENTS 4,608,141 A * 8/1986 Chlanda ............... B01D 61/445
                                                          204/538
4,740,281 A * 4/1988 Chlanda .................. C23G 1/36
                                                          204/531
(Continued)

FOREIGN PATENT DOCUMENTS

CN    1259174 A    7/2000
CN    105849317 A    8/2016
(Continued)

OTHER PUBLICATIONS

"Selemion Catalogue", Jan. 2013, Asahi Glass Co, p. 1-18 (Year: 2013).*
(Continued)

*Primary Examiner* — Luan V Van
*Assistant Examiner* — Andrew Koltonow

(57) ABSTRACT

A bipolar electrodialysis (BPED) cell is able to bipolar convert salt solutions into acid and base solutions. However, protons migrate through the anion exchange membranes and tend to neutralize the base solution. In a bipolar electrodialysis system described herein, multiple BPED cells are arranged to provide a multi-stage treatment system. Up to half, or up to one third, of the stages have cells with acid block anion membranes. The one or more stages with acid (Continued)

block anion membranes are located at the acid product output end of the system, where the acid concentration in the system is the highest. Replacing the traditional anion membranes in some of the stages with acid block anion membranes allows higher concentration products to be produced with moderate increase in energy consumption.

7 Claims, 6 Drawing Sheets

(51) Int. Cl.
  *B01D 69/02* (2006.01)
  *C02F 1/469* (2023.01)
  *B01D 61/50* (2006.01)

(52) U.S. Cl.
  CPC ............ *C02F 1/4691* (2013.01); *B01D 61/50* (2013.01); *B01D 2317/02* (2013.01); *B01D 2317/08* (2013.01); *B01D 2325/42* (2013.01)

(56) References Cited

U.S. PATENT DOCUMENTS

| | | | | |
|---|---|---|---|---|
| 5,162,076 | A * | 11/1992 | Chiao | C01D 1/38 204/534 |
| 5,294,316 | A * | 3/1994 | Schmidt | C01D 1/38 204/537 |
| 5,645,703 | A * | 7/1997 | Tsai | B01D 61/445 204/538 |
| 5,853,555 | A | 12/1998 | Sharifian et al. | |
| 6,140,428 | A * | 10/2000 | Seeliger | C08G 69/48 204/544 |
| 8,142,633 | B2 | 3/2012 | Batchelder et al. | |
| 8,470,896 | B2 * | 6/2013 | Zheng | C08J 5/2206 521/38 |
| 8,740,896 | B2 | 6/2014 | Zarins et al. | |
| 11,577,202 | B2 * | 2/2023 | Demeter | B01D 61/445 |
| 2013/0126353 | A1 | 5/2013 | Perez et al. | |

FOREIGN PATENT DOCUMENTS

| | | |
|---|---|---|
| CN | 105985475 A | 10/2016 |
| EP | 0856351 A2 | 8/1998 |
| EP | 3060699 A1 | 8/2016 |
| JP | 2008296204 A | 12/2008 |
| JP | 2012149001 A | 8/2012 |
| JP | 2014505762 A | 3/2014 |
| WO | 2013074231 A1 | 5/2013 |
| WO | 2016200387 A1 | 12/2016 |
| WO | 2017071116 A1 | 5/2017 |

OTHER PUBLICATIONS

Chinese Patent Application No. 201810204417.8, Office Action dated Nov. 3, 2021.
Xu, Tongwen et al., "Ion exchange membranes: State of their development and perspective", Journal of Membrane Science, vol. 263, Oct. 15, 2005, pp. 1-29.
De Groot, Matheus T., et al. "Bipolar membrane electrodialysis for the alkalinization of ethanolamine salts", Journal of Membrane Science, vol. 378, May 20, 2011, pp. 415-424.
International Patent Application No. PCT/US2019/021784, International Search Report and Written Opinion dated May 24, 2019.
International Patent Application No. PCT/US2019/021784, International Preliminary Report on Patentability dated Sep. 24, 2020.
Taiwanese Patent Application No. TW20190107006, Office Action and Search Report dated Sep. 27, 2022.
Japanese Patent Application No. 2020-548737, Office Action dated Dec. 20, 2022 (English Translation).
European Patent Application No. 19713317.6, European Office Action dated Mar. 30, 2023.
Yu Shuaijun et al: "Proton blockage PVDF-co-HFP-based anion exchange membrane for sulfuric acid recovery in electrodialysis", Journal of Membrane Science, vol. 653, Jul. 1, 2022, p. 120510.
Chinese Patent Application No. 201810204417.8 Office Action dated Jun. 14, 2022.
European Patent Application No. 19713317.6, European Office Action dated May 25, 2022.
Taiwanese Patent Application No. 108107006, Office Action dated Aug. 24, 2023.

* cited by examiner

MULTI-STAGE BIPOLAR ELECTRODIALYSIS SYSTEM FOR HIGH CONCENTRATION ACID OR BASE PRODUCTION

RELATED APPLICATIONS

This application is a National Stage Entry of International Application No. PCT/US2019/021784, filed Mar. 12, 2019, which claims the benefit of Chinese Patent application Ser. No. 20/181,0204417.8, filed Mar. 13, 2018.

FIELD

This disclosure relates to bipolar electrodialysis systems and methods used to produce acids or bases from salt solution.

BACKGROUND

The following paragraphs are not an admission that anything discussed in them is prior art or part of the knowledge of persons skilled in the art.

A bipolar electrodialysis cell refers to an electrodialysis cell that includes a bipolar membrane. The bipolar membrane disassociates water into hydronium ions and hydroxyl ions on application of an electrical field. These generated ions combine with cations and anions from a process stream that includes salts, where the cations and anions are separated by one or more ion exchange membranes in the electrodialysis cell. The combination of the hydronium ions with the anions, and the hydroxyl ions with the cations, results in produced streams having acid and base.

A bipolar electrodialysis cell may be a two-compartment cell or a three-compartment cell. A two-compartment cell includes either a cation-exchange membrane or an anion-exchange membrane between two bipolar membranes. The choice of using a cation-exchange membrane or an anion-exchange membrane depends on which salts are being processed. Cation-exchange membranes are used to process solutions having salts of weak acids and strong bases, such as sodium salts of organic and amino acids. Examples of such organic and amino acids include: ascorbic acid, acetic acid, lactic acid, formic acid, gluconic acid, and glutamic acid. Anion-exchange membranes are used to process solutions having salts of weak bases and strong or weak acids, such as ammonium salts of chloride, sulfate or lactate.

A three-compartment cell includes an anion-exchange membrane and a cation-exchange membrane between two bipolar membranes, thereby forming three compartments. The three compartments are: an acidic solution-producing compartment between the first bipolar membrane and the anion-exchange membrane; a basic solution-producing compartment between the second bipolar membrane and the cation-exchange membrane; and a compartment between the cation-exchange membrane and the anion-exchange membrane that produces a salt-reduced solution. A three-compartment BPED cell is used for recovering an inorganic acid and base from its corresponding salt.

INTRODUCTION

The following introduction is intended to introduce the reader to this specification but not to define any invention. One or more inventions may reside in a combination or sub-combination of the apparatus elements or method steps described below or in other parts of this document. The inventors do not waive or disclaim their rights to any invention or inventions disclosed in this specification merely by not describing such other invention or inventions in the claims.

A bipolar electrodialysis (BPED) cell is able to convert salt solutions into acid and base solutions. However, protons migrate through the anion exchange membranes and tend to neutralize the base solution. With increasing acid concentration, the flow of protons increases. This reduces the energy efficiency of the cell and, in practice, limits the concentration of the acid produced. Typically, acids and bases are produced in conventional BPED systems at a concentration of about 1 mol/L and 70% current efficiency. In some cases, this concentration is enough to provide a usable product, but form most applications the product concentration is too low to reuse or sell the acid and base products.

In a bipolar electrodialysis system described herein, multiple BPED cells are arranged to provide a multi-stage treatment system. In a system with three compartment BPED cells, the feed solution flows in the opposite direction as the base solution and acid solution. In a two compartment BPED system, the feed/acid solution flows in the same direction as the base solution. Up to half, or up to one third, of the stages have cells with acid block anion membranes. For example one stage in a system having two or three stages may have acid block anion membranes, or one or two stages in a system having have four to eight stages may have acid block anion membranes. The one or more stages with acid block anion membranes are located at the acid product output end of the system, where the acid concentration in the system is the highest. The remainder of the stages have conventional, i.e. non-acid block, anion membranes.

Replacing the traditional anion membranes in some of the stages with acid block anion membranes reduces the migration of protons into the base solution. This allows higher concentration products to be produced. However, acid block anion membranes have less conductivity (higher resistance) compared to traditional anion membranes, which would result in a significant increase in energy consumption if all of the anion membranes were replaced. By using the acid block anion membranes only where the acid concentration in the system is high, product concentration can be increased with less increase in energy consumption compared to a system in which anion membranes are replaced in all of the stages.

DETAILED DESCRIPTION

Bipolar membrane electrodialysis (or, bipolar electrodialysis, BPED) is a process that couples electrolysis and electrodialysis. The BPED device receives a salt solution and provides an acidic solution and a basic solution. A bipolar membrane electrodialysis cell may be a two or three compartment cell, depending on the acid and base to be produced.

A two compartment cell may include bipolar membranes and either cation exchange membranes or anion exchange membranes. In examples described herein, the two compartment cell includes anion exchange membranes. Two compartment cells that include bipolar membranes and anion exchange membranes are useful to convert the salts of strong acids and weak bases, such as, for example, ammonium chloride, ammonium sulfate, and ammonium lactate. In three compartment cells it is possible to convert an aqueous salt solution into strong bases and strong acids, such as, for example, the conversion of NaCl solution into NaOH solution and HCl solution. Other salts, for example KF, $Na_2SO_4$, $NH_4Cl$, KCl, as well as the salts of organic acids and bases, can also be converted using three compartment cells.

Figure 1:
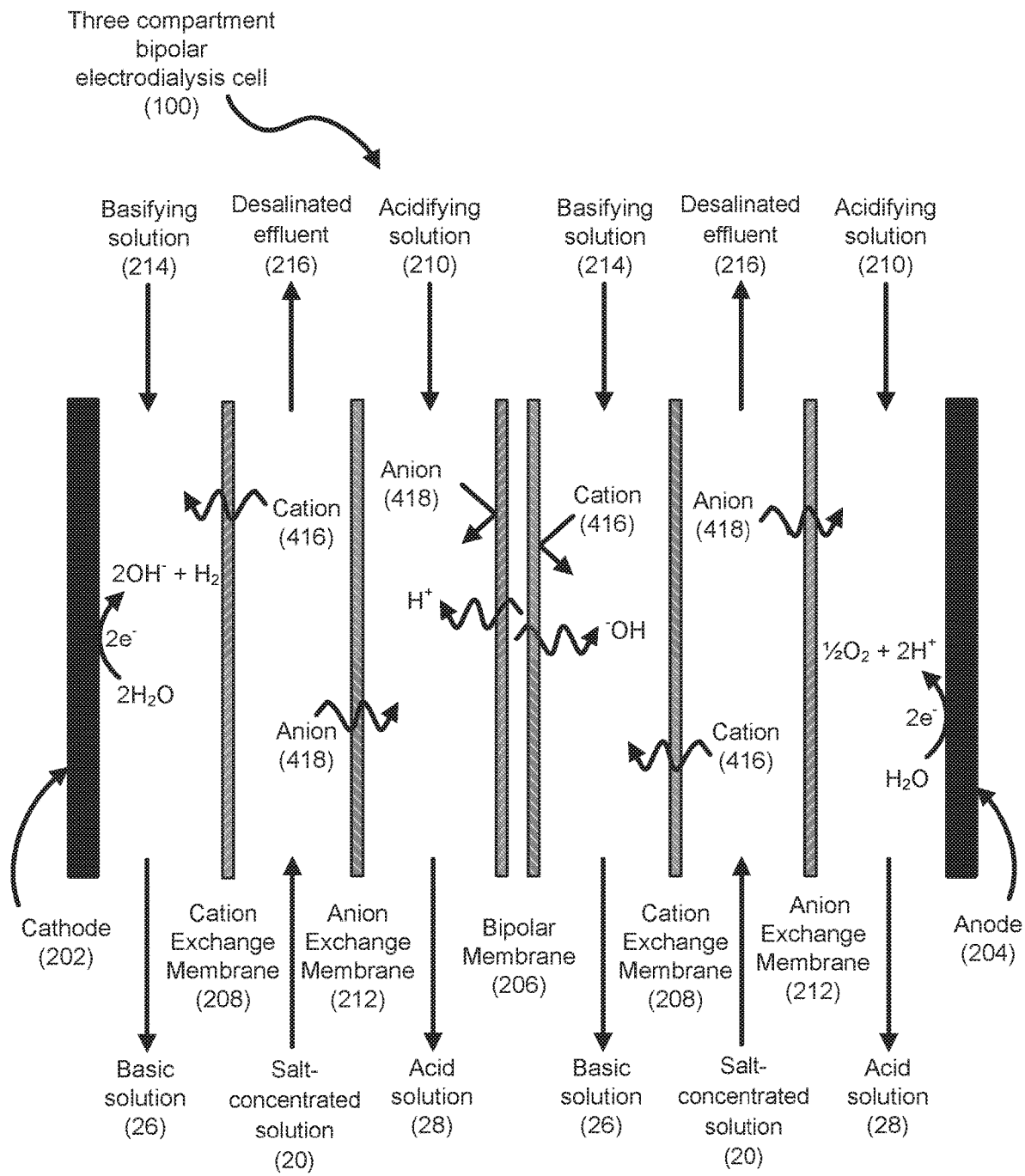
FIG. 1 is a schematic illustration of a three compartment bipolar electrodialysis cell.

An illustration of a three compartment bipolar electrodialysis cell (100) is shown in FIG. 1. The three compartment bipolar electrodialysis cell (100) illustrates two cells between cathode (202) and anode (204) to simplify the figure, though many cells are typically provided in a bipolar electrodialysis stack. Using electrolysis, bipolar electrodialysis disassociates water, which is found between a cation exchange membrane portion and an anion exchange membrane portion of the bipolar membrane (206), into $H^+$ and $^-OH$. Application of an applied electric potential difference induces the produced $H^+$ ions to move towards the cathode (202), through cation exchange membranes (208), into an acidifying solution (210). Similarly, the produced $^-OH$ ions to move towards the anode (204), through anion exchange membranes (212), into a basifying solution (214). In a similar manner, cations (416) and anions (418) in the salt solution (20) are induced to move through the cation and anion exchange membranes, respectively, as charge balance for the $H^+$ and $^-OH$ ions, resulting in desalinated effluent (216) being discharged from the cell (200). The three compartment bipolar electrodialysis cell (100) shown is operating in a counter-current mode because the salt concentrated solution (20) (i.e. feed water) moves in the opposite direction as the acidifying solution (210) and the basifying solution (214).

With acceptance of the $H^+$ ions, the acidifying solution (210) becomes acidic and is discharged from the bipolar electrodialysis cell (200) as the acid solution (28). Conversely, with acceptance of the $^-OH$ ions, the basifying solution (214) becomes basic and is discharged from the bipolar electrodialysis cell (200) as the basic solution (26).

The acidifying solution (210) and the basifying solution (214) include ions to carry the applied current. These ions become the counter-ions of in the produced acids and bases. The acidifying solution (210), the basifying solution (214) and the salt-concentrated solution (20) may all be the same or different.

In one example, the acidifying solution, the basifying solution and the salt-concentrated solution are all NaCl/water solutions, where the resulting acid solution is an HCl/water solution and the resulting basic solution is an NaOH/water solution. In another example, the acidifying solution, the basifying solution and the salt-concentrated solution are all sodium sulfate/water solutions, where the resulting acid solution is an $H_2SO_4$/water solution and the resulting basic solution is an NaOH/water solution. In yet another example, the acidifying solution, the basifying solution and the salt-concentrated solution are all mixtures of different salts, such as sodium sulfate and NaCl, and the resulting acid solution is an $H_2SO_4$/HCl/water solution and the resulting basic solution is an NaOH/water solution.

In still another example, the acidifying solution and the basifying solution are water, while the salt-concentrated solution is a NaCl/water solution, where the resulting acid solution is an HCl/water solution and the resulting basic solution is an NaOH/water solution.

Figure 2:
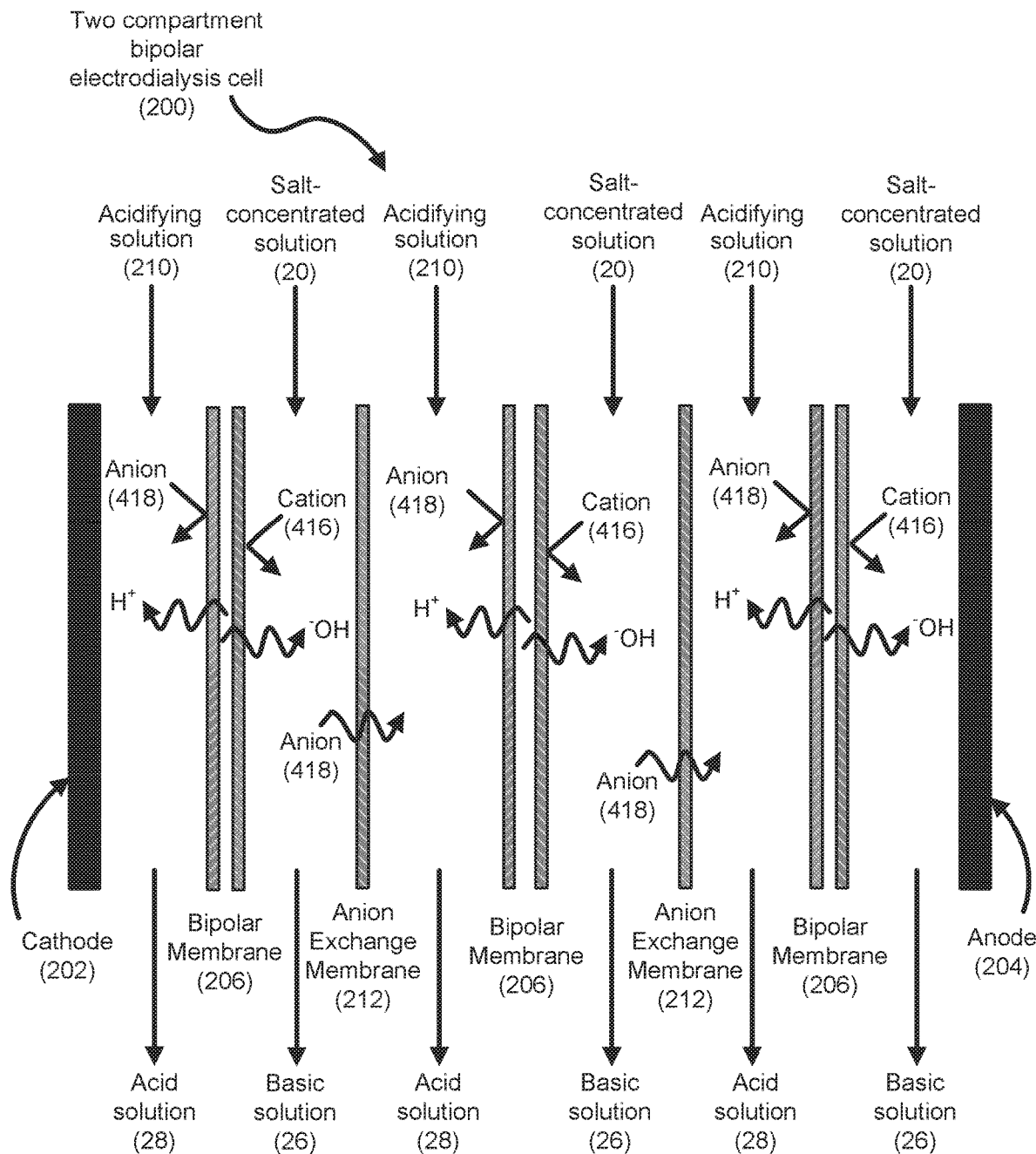
FIG. 2 is a schematic illustration of a two compartment bipolar electrodialysis cell with anion exchange membranes.

An illustration of a two compartment bipolar electrodialysis cell (200) with anion exchange membranes is shown in FIG. 2. The bipolar electrodialysis cell (200) illustrates two full cells between cathode (202) and anode (204) to simplify the figure, though many cells are typically provided in a bipolar electrodialysis stack. Using electrolysis, bipolar electrodialysis disassociates water, which is found between a cation exchange membrane portion and an anion exchange membrane portion of the bipolar membrane (206), into $H^+$ and $^-OH$. Application of an applied electric potential difference induces the produced $H^+$ ions to move towards the cathode (202) into an acidifying solution (210), and the produced $^-OH$ ions to move towards the anode (204) into the salt-concentrated solution (20). The bipolar electrodialysis cell (200) includes anion exchange membranes (212). The two compartment bipolar electrodialysis cell (200) is operating in a co-current mode because the acidifying solution (210) and salt-concentrated solution (20) flow in the same direction.

With acceptance of the $H^+$ ions, the acidifying solution (210) becomes acidic and is discharged from the bipolar electrodialysis cell (200) as the acid solution (28). Conversely, with acceptance of the $^-OH$ ions, the salt-concentrated solution (20) becomes basic and is discharged from the bipolar electrodialysis cell (200) as the basic solution (26).

The acidifying solution (210) and the salt-concentrated solution (20) include ions to carry the applied current. These ions become the counter-ions of in the produced acids and bases. The acidifying solution (210) and the salt-concentrated solution (20) may be the same or different.

In multi-stage bipolar electrodialysis systems to be described below, the anion exchange membranes in some, but not all, of the stages are replaced with acid block anion membranes. In one example, polymeric acid block anion selective membranes are prepared by impregnating a woven or non-woven cloth with the reaction products of three components. Component I is an ethelynically unsaturated aliphatic or aromatic tertiary or quaternary amine monomer. Component II is a cross-linking monomer. Component III is vinylbenzyl chloride. Membranes of this type are described in greater detail in U.S. Pat. No. 8,470,896, Acid Block Anion Membrane, which is incorporated herein by reference.

Figure 3:
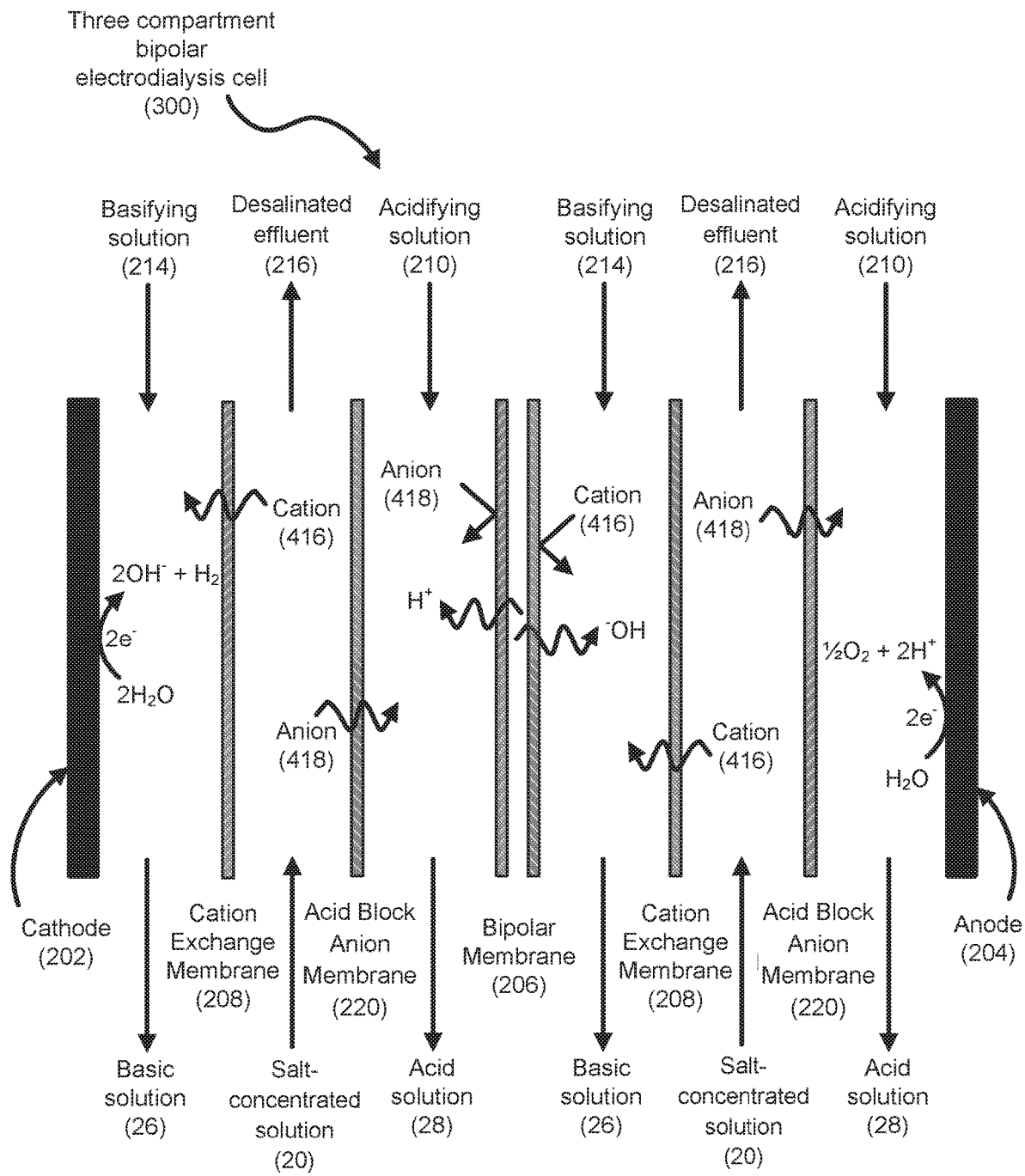
FIG. 3 is a schematic illustration of a three compartment bipolar electrodialysis cell with acid block anion membranes.

FIG. 3 shows a three compartment electrodialysis cell (300) with acid block anion exchange membranes (220). The cell (300) of FIG. 3 is similar to the three compartment electrodialysis cell (100) of FIG. 1, and the description of FIG. 1 applies to FIG. 3, except that anion exchange membranes (212) of FIG. 1 have been replaced with acid block anion membranes (220) in FIG. 3.

Figure 4:
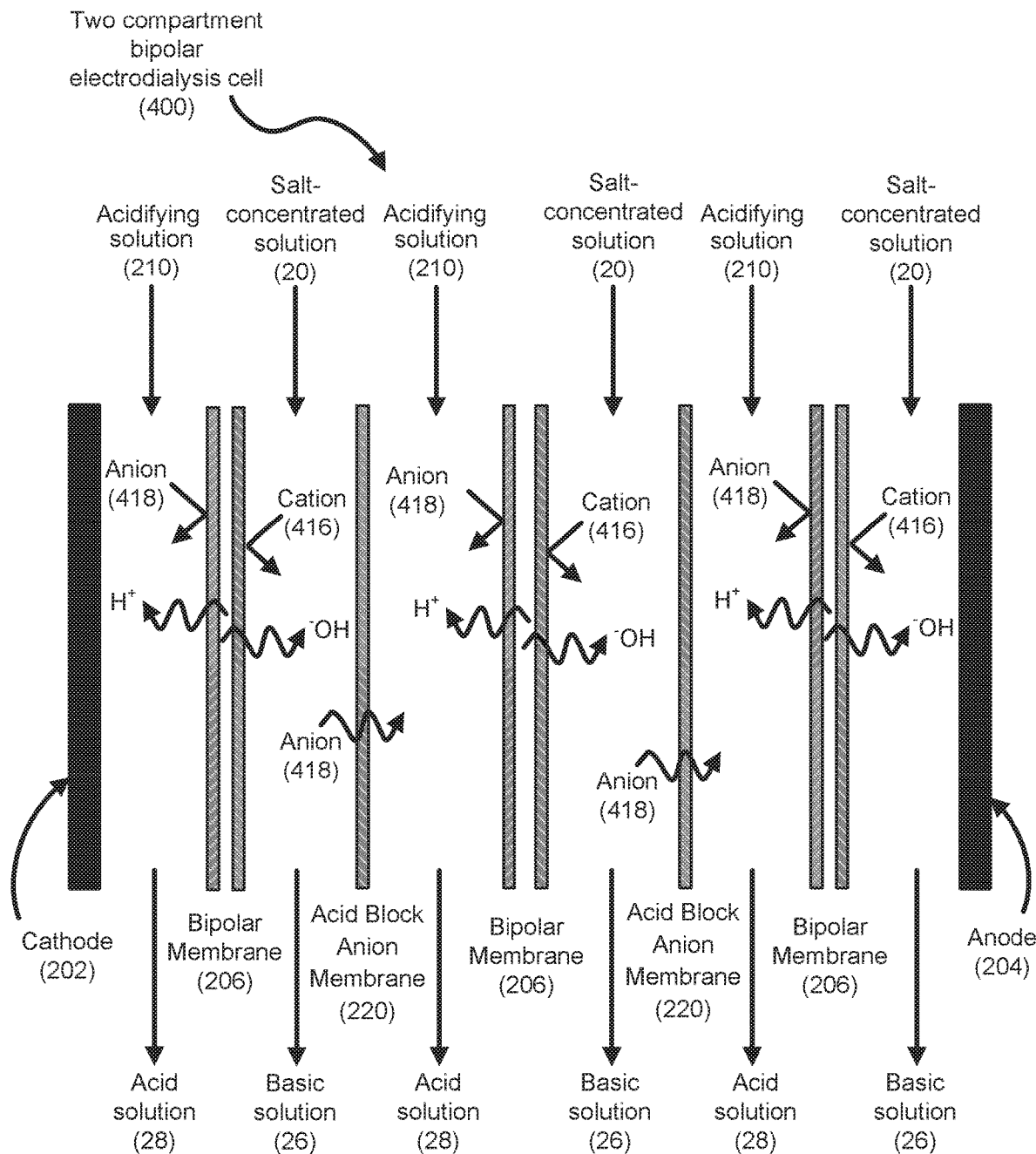
FIG. 4 is a schematic illustration of a two compartment bipolar electrodialysis cell with acid block anion membranes.

FIG. 4 shows a two compartment electrodialysis cell (400) with acid block anion exchange membranes (220). The cell (400) of FIG. 4 is similar to the two compartment electrodialysis cell (200) of FIG. 2, and the description of FIG. 2 applies to FIG. 4, except that anion exchange membranes (212) of FIG. 2 have been replaced with acid block anion membranes (220) in FIG. 4.

Figure 5:
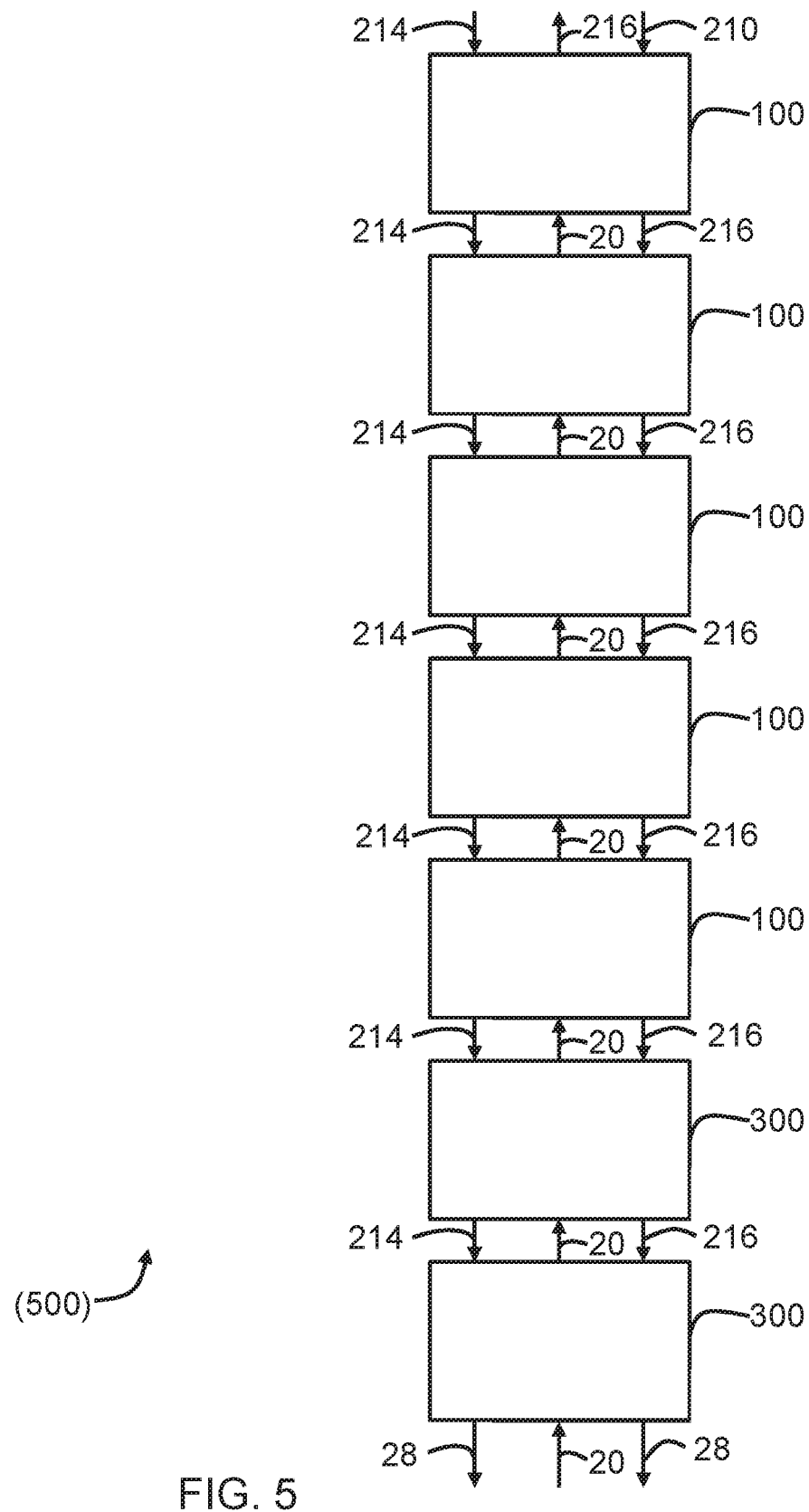
FIG. 5 is a schematic illustration of a multi-stage three-compartment bipolar electrodialysis cell with counter current flow and some of the stages having acid block anion membranes.

FIG. 5 shows a multi-stage bipolar electrodialysis system (500) with three compartment electrodialysis cells (100, 300) operating in counter-current mode. In the example shown, there are two three compartment electrodialysis cells with acid block anion membranes (300) and five three compartment electrodialysis cells (100). Salt-concentrated solution (20) enters the system (500) through one of the three compartment electrodialysis cells with acid block anion membranes (300). The acidifying solution (210) and the basifying solution (214), which may start as make up water, enter the system (500) through one of the three compartment electrodialysis cells (100). Concentrated acidifying solution (210) flows through the three-compartment electrodialysis cell with acid block anion membranes (300) but the migration of protons is inhibited by the acid block anion membranes.

Figure 6:
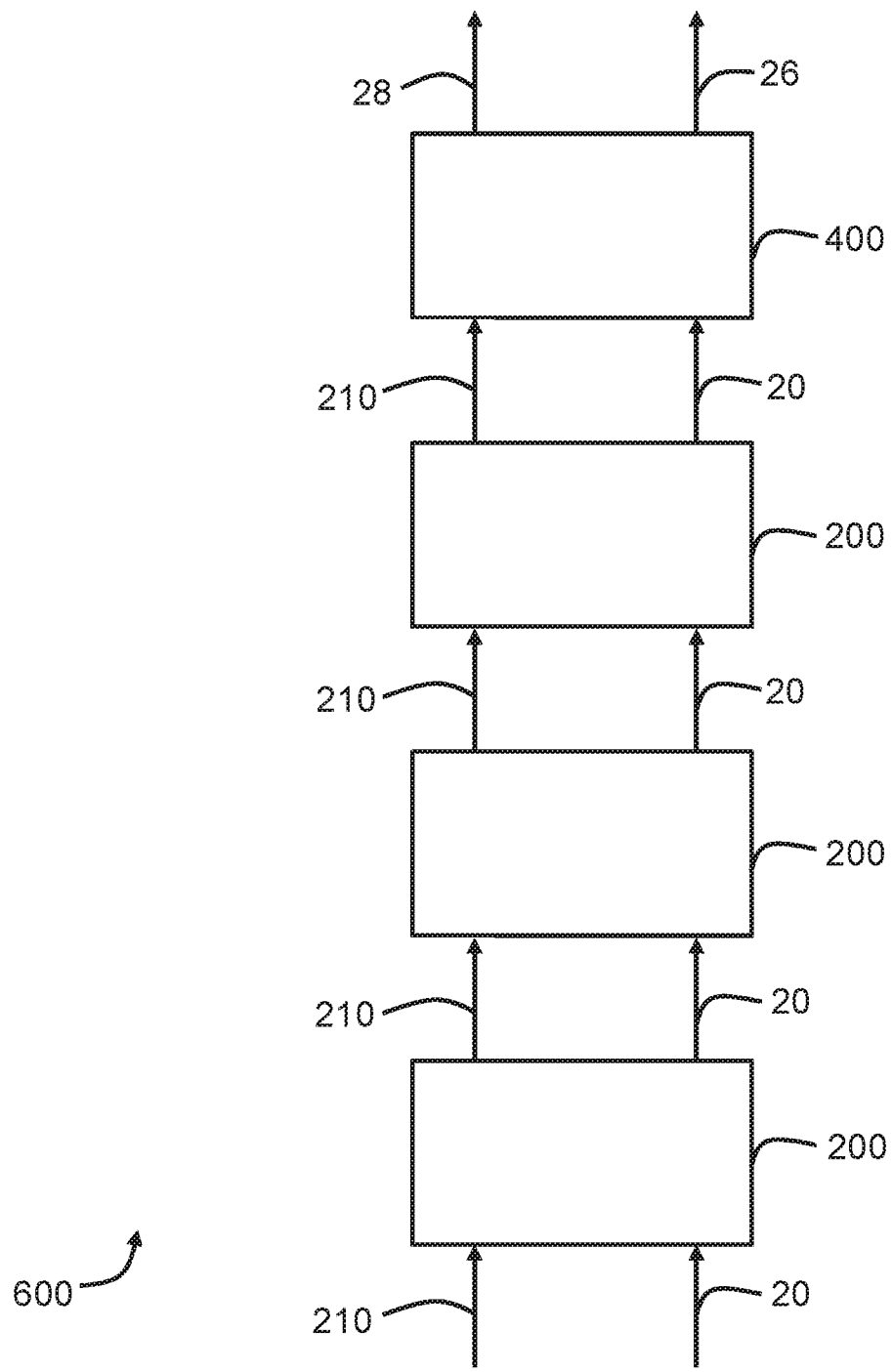
FIG. 6 is a schematic illustration of a multi-stage two-compartment bipolar electrodialysis cell with co-current flow and acid block anion membranes and some of the stages having acid block anion membranes.

FIG. 6 shows a multi-stage bipolar electrodialysis system (600) with two compartment electrodialysis cells (200, 400) operating in co-current mode. In the example shown, there is one two-compartment electrodialysis cell with acid block anion membranes (400) and three two-compartment electrodialysis cells (200). Salt-concentrated solution (20) enters the system (600) through one of the two-compartment electrodialysis cells (200). The acidifying solution (210), which may start as make up water, also enter the system (600) through one of the two compartment electrodialysis cells (200). Concentrated acidifying solution (210) flows through the two-compartment electrodialysis cell with acid block anion membranes (400) but the migration of protons is inhibited by the acid block anion membranes.

This written description uses examples to help disclose the invention, including the best mode, and also to enable any person skilled in the art to practice the invention, including making and using any devices or systems and performing any incorporated methods. Alterations, modifications and variations can be effected to the particular examples by those of skill in the art without departing from the scope of the invention. The patentable scope of the invention is defined by the claims, and may include other examples that occur to those skilled in the art.

We claim:

1. A bipolar electrodialysis (BPED) system comprising, a plurality of bipolar electrodialysis stages wherein all of the plurality of bipolar electrodialysis stages comprise BPED cells, wherein all of the BPED cells in all of the bipolar electrodialysis stages of the BPED system are two-compartment BPED cells or all of the BPED cells in all of the bipolar electrodialysis stages of the BPED system are three-compartment BPED cells, and wherein at least one and up to one half of the plurality of the bipolar electrodialysis stages comprise acid block anion membranes and the remainder of the plurality of bipolar electrodialysis stages comprise non-acidic block anion membranes.

2. The bipolar electrodialysis (BPED) system of claim 1 wherein at least one and up to one third of the plurality of the bipolar electrodialysis stages comprise acid block anion membranes.

3. The bipolar electrodialysis (BPED) system of claim 1 wherein one or two of the plurality of the bipolar electrodialysis stages comprise acid block anion membranes.

4. The bipolar electrodialysis (BPED) system of claim 1 wherein each of the plurality of bipolar electrodialysis stages comprises three-compartment BPED cells configured such that a feed solution flows in the opposite direction as a basifying solution and an acidifying solution.

5. The bipolar electrodialysis (BPED) system of claim 4 wherein a salt-concentrated solution flows first through the bipolar electrodialysis stages comprising the acid block anion membranes.

6. The bipolar electrodialysis (BPED) system of claim 1 wherein each of the plurality of bipolar electrodialysis stages comprises two-compartment BPED cells configured such that a feed solution flows in the same direction as an acidifying solution.

7. The bipolar electrodialysis (BPED) system of claim 6 wherein a salt-concentrated solution flows last through the bipolar electrodialysis stages comprising the acid block anion membranes.

* * * * *